F. W. MITCHELL AND J. E. PFEFFER.
METHOD OF AND APPARATUS FOR PURIFYING LIQUIDS.
APPLICATION FILED AUG. 2, 1918.
1,431,245.
Patented Oct. 10, 1922.
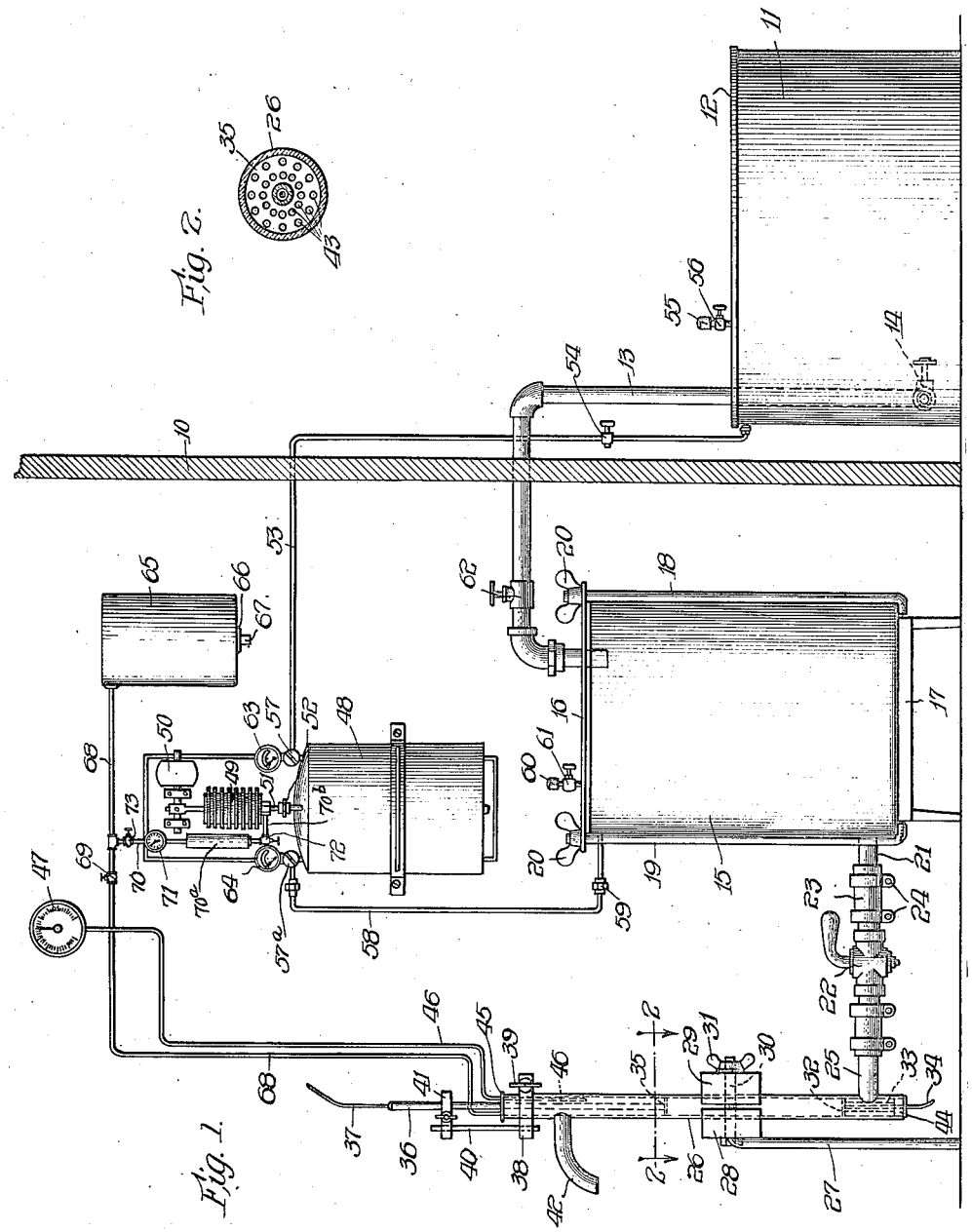
Witnesses:
Inventors:
Frederick W. Mitchell
John E. Pfeffer,
By
Attys.

Patented Oct. 10, 1922.

1,431,245

UNITED STATES PATENT OFFICE.

FREDERICK W. MITCHELL AND JOHN E. PFEFFER, OF CHICAGO, ILLINOIS.

METHOD OF AND APPARATUS FOR PURIFYING LIQUIDS.

Application filed August 2, 1918. Serial No. 247,956.

*To all whom it may concern:*

Be it known that we, FREDERICK W. MITCHELL and JOHN E. PFEFFER, both citizens of the United States, residing at Chicago, in the county of Cook and State of Illinois, have invented certain new and useful Improvements in Methods of and Apparatus for Purifying Liquids, of which the following is a specification.

Our invention relates to method of and apparatus for purifying liquids and has particular reference to purifying liquid foods as for instance milk, and has for its principal object the provision of a method and apparatus wherein milk contained within a series of closed receptacles is caused to travel through the containers in such manner that an electric current is passed therethrough, which current has the effect of killing all bacteria within the milk or other liquid and rendering the milk sterile and without in any manner altering the taste, color or properties of the liquid which is treated.

Another and further object of the invention is the provision of an apparatus whereby the liquid is forced through a series of containers and completes during its passage through the containers one or more electric circuits in such manner that the current of electricity passes through the milk which is being treated, the voltage of the electricity being high enough to kill all germ life and bacteria within the milk.

Another and further object of our invention is the provision of an apparatus for electrically treating liquid food whereby a uniform current charge will be passed through each unit of food which is treated regardless of the velocity of flow of the liquid through the apparatus which thus insure each unit of food being thoroughly subjected to the lethal action of the electric current which by reason of the high voltage necessary is important to insure the liquid being thoroughly treated.

We are aware that various methods and apparatus have been heretofore devised for the treating of liquid food products, and particularly milk, by an electric current; but such methods and apparatus have relied upon the action of gravity to cause a flow of the liquid and necessarily the quantity of liquid treated is very small, and such apparatus has only been used in an experimental way within a laboratory and not in a commercial way.

Another and further object of our invention is the provision of an apparatus which has a sufficient capacity so that it can be used for the treatment of the liquid food products such as milk in sufficient quantities so that the system can be used commercially.

Another and further object of the invention is the provision of a system for the treating of milk or other liquid food products which is completely enclosed during the entire course of the treatment of the milk and which affords no opportunity for the absorption of impurities from bacteria laden air, or gases or odors or to cause recontamination from the atmosphere in any manner as is the case with ordinary open systems of milk treatment.

These and other objects of the invention will be more fully and better understood by reference to the accompanying sheet of drawings and in which—

Fig. 1 is a general plan view in elevation showing our complete milk purifying apparatus;

Fig. 2 is a cross sectional view on lines 2—2 of Fig. 1 and showing one of the electrodes.

Referring now specifically to the drawings and in which like reference characters refer to like parts throughout, a wall of a building 10 is shown, upon one side of which is a receiving tank 11 having a gasket cover 12 fitted thereon so that the cover prevents the escape of compressed air forced into the receiving tank 11 as hereinafter described. Leading from the receiving tank or vat is a transfer pipe 13 with a valve 14 secured to said pipe so that the flow of milk from the receiving tank 11 can be shut off at any time. Or it may be desirable to provide two receiving tanks into which milk or other liquid can be emptied alternately so that the supply tank hereinafter described may be kept sufficiently supplied with milk at all times, in which case the transfer pipe 13 would be connected to both vats or tanks. The transfer pipe 13 leads to a supply tank 15, preferably of glass or other suitable non-conductor of electricity, which is also fitted with a tight cover 16 and is mounted upon a suitable base 17. The cover 16 is held in position by a pair of cover clamp rods 18, 19, respectively which fit under the bottom of the tank 15 and to which at their top ends are secured thumb screws 20, 20. The rods 18 and 19 pass through the cover 16 so that when the thumb screws 20, 20 are tightened down the cover is held securely in position. Leading from the bottom of the tank 15 is an outlet pipe 21 to which a valve 22 is secured with a hose section 23 having clamps 24, 24 to hold the hose tightly over the outlet pipe 21. Another section of pipe 25 leads from the valve 22 to an upright pipe 26 which is preferably made of glass or may be made of any other suitable material which is a non-conductor of electricity. The pipe 26 with the mechanism secured thereto are held in position by a vertical rod 27 which has secured to its upper end a pair of clamp blocks 28, 29 respectively, and preferably of rubber or other non-conductor of electricity which surround the glass tube 26. A screw 30 to which is secured a thumb nut 31 passes through the blocks 28 and 29 so that the vertical tube 20 can be clamped and held securely in position. Fitted within the bottom of the tube 26 is a perforated electrode 32 secured in any suitable manner to a hollow electrically insulated holding member or tube 33, preferably of glass, through which a terminal wire 34 passes and is secured to the electrode 32 at one end, the other end passing to a dynamo or other source of electric current for the electrode 32. Mounted within the upper end of the tube 26 is another perforated electrode 35 secured to the end of a vertically extending electrically insulated tube 36, preferably of glass, and through which a terminal wire 37 passes which is secured to the upper electrode 35 at one of its ends, the other end of the wire leading to the same source of electric current as the terminal wire 34 so that as the liquid enters the lower end of the vertical pipe 26 and passes upward through the lower perforated electrode 32 and up to the upper perforated electrode 35, the electric circuit is completed and the current flows freely through the column of liquid thus formed in the pipe 26 between the electrodes. The diameter of each of said electrodes 32 and 35 is approximately the same as the inside diameter of the tube 20 and therefore the discharge area of the said electrodes is substantially the same as the inside diameter of the tube 20. A clamp 38 held in position by means of a thumb screw 39 surrounds the vertical tube 26 at its upper end and has permanently secured thereto a vertically extending rod 40 in any suitable manner. A clamp 41 secured to the rod 40 and the terminal tube 36 provides for vertical adjustment of the rod 36 in any desired position, thus providing means for increasing or diminishing the distance between the electrodes 35 and 32 as may be desired, this distance depending upon the intensity of the current which is passed through the liquid and also to the length of time it may be desired to subject the liquid to the action of the current. An outlet spout 42 secured to the tube 26 in any approved manner or formed integrally therewith provides means for the milk or liquid which is being treated to be discharged out of the tube 26. The electrodes 35 and 32 may be imbedded in a suitable material such as platinum or cork, or may be exposed as desired. Perforations 43 as shown in Fig. 2 are provided through the electrodes so as to allow for the passage of the liquid directly through the electrodes, and have the outer or marginal edges of the electrodes in contact with the walls of the tube 26. The tube 26 is closed at the bottom by means of a plug 44 and at its top by means of a cap 45 and through which the tube 36 extends. The terminal wire 34 passes through the plug 44 and into the hollow holding member 33 which member rests upon the plug 44. Extending through the cap 45 and down into the tube 26 a sufficient distance so as to come in contact with the liquid passing through the tube is a pipe 46 which leads to a wall thermometer 47 so that the temperature of the liquid may be indicated as it passes through the tube 26.

Secured in any suitable position with respect to the apparatus is a compressed air reservoir 48 which has suitable connections with an air compressor 49 which is operated by an electric motor 50 and which serves to keep the air reservoir 48 supplied with compressed air through a pipe 51 leading from the air compressor to the air reservoir 48. A valve 52 is secured to the pipe 51 so that the compressed air within the tank can be shut off at any time. Leading from the air reservoir 48 to the receiving tank 11 is a pipe 53 through which compressed air is carried to the receiving tank 11, a valve 54 being provided in the pipe so that the pressure upon the tank 11 may be increased or diminished at will. An automatic release valve 55 is secured to the cover 12 of the vat 11 so that should the pressure increase to an excessive amount, escape means are provided so that the air will automatically escape from the tank 11. A hand valve 56 is interposed in the pipe from the tank 11 to the release valve 55 so that if desired the release valve can be shut off entirely. A reducing valve 57 immediately adjacent the air reservoir 48 and through which the compressed air passes into the pipe 53 is also provided by means of which the compressed air supply to the tank 11 can also be cut off if desired, and the pressure upon the receiving tank controlled. Leading from the reservoir 48 to the supply tank 15 is a pipe 58 through which compressed air is conducted to the tank 15, a check valve union 59 being provided to prevent the air pressure from flowing backward through the pipe 58 and maintaining a uniform pressure within the supply tank 15 at all times. A release valve 60 similar to the one secured to the receiving tank 11 is provided, allowing for the automatic escape of the compressed air if an excessive pressure is for any reason obtained within the supply tank 15. A hand valve 61 is also provided so that the air may be closed away from the relief valve for any reason desired. A hand valve 62 is also provided in the transfer pipe 13 so that the supply of liquid may be cut off from the tank 11 into the supply tank 15 or the quantity of flow of the liquid may be controlled in any manner desired. Pressure indicating gauges 63, 64 respectively are secured to the reservoir 48 so that the amount of pressure which is being maintained upon the receiving tank 11 and the supply tank 15 may be indicated and regulated as desired by means of the reducing valves 57 and 57ª. It will be understood that it is necessary to maintain a higher pressure upon the receiving tank 11 than upon the supply tank 15 otherwise the liquid could not be forced from the receiving tank into the supply tank.

A vacuum tank 65 is provided with an opening 66 at its bottom, which opening is automatically closed by means of a downwardly swinging valve 67 hingedly secured to the bottom of the tank 65 as long as a vacuum is maintained within the tank 65 but if at any time during the operation of the apparatus the vacuum tank should become filled with air or the gaseous impurities drawn off from the milk to a point equal to the atmospheric pressure outside of said tank then the valve 67 will open and the gaseous impurities drawn from the liquid will pass out. A pipe 68 which passes through the cup 45 leads from the top of the tube 26 to the vacuum tank 65 and provides means whereby the gases formed by the action of the electric current upon the liquid being treated will be drawn off from the top of the tube 26 and away from the milk or other liquid which is being treated. A valve 69 is interposed in the pipe 68 so that the air may be exhausted out of the vacuum tank 65 by the air compressor 49. Secured to the pipe 68 by means of a suitable union is a downwardly extending pipe 70 which leads to a partial vacuum chamber 70ª and which is connected to the intake of the air compressor 49 by means of another small pipe 70ᵇ. A vacuum gauge 71 is secured to this pipe 70 so as to indicate the extent of vacuum within the tank 65. A valve 72 is also provided immediately adjacent the intake to the air compressor 49 so that this pipe can be closed at any time, as during the time the apparatus is treating liquid in the pipe 26.
In operation of the system it will be understood that liquid such as milk to be treated as for instance in a dairy where milk of varying degrees of butter fat is received will be emptied into the receiving tank 11 so that the milk is mixed until the receiving tank 11 is at least partially filled; then the cover 12 will be secured to the receiving tank 11, the valve 54 will be opened, so that compressed air is admitted into the receiving tank 11, which will force the milk out through the transfer pipe 13, the valve 62 being open, into the supply tank 15. The flow of milk into the supply tank 15 can be regulated by means of the valve 62 in any quantity desired. The reducing valve 57ª is thereupon opened so as to admit a suitable supply of compressed air into the supply tank 15 so that a suitable pressure will be exerted upon the milk within the supply tank 15. The valve 22 will thereupon be opened and the milk will pass from the supply tank 15 through the system of outlet pipes 21 and 25 and valve 22 and through the perforated electrode 32 located in the lower end of the pipe 26. The milk under pressure of the compressed air will be forced upward into the pipe 26 and through the perforated electrode 35 in the upper end of the pipe 36. As soon as the milk comes into contact with the upper electrode 35 an electric current will be established between the electrodes and through the column of milk within the pipe 26 as the milk passes through the said pipe and through the perforated electrode 35 in the upper end of the pipe, the milk passing upward and out through the outlet pipe 42 into any suitable receptacle, or, as we prefer, the milk may be led directly and through a closed system of pipes to a cooling apparatus, and thence into sealed packages of any description for the market or storage so there is no opportunity for recontamination of the milk treated.

It will be thus understood that the milk is subjected to the lethal action of the electric current which will have the effect of killing all of the bacteria and germ life within the milk and in addition the milk will be heated to a temperature which will cause the impurities to be carried away from the milk in the form of a light vapor or gas. It will be understood that the milk which is treated will reach the highest temperature as it reaches the upper part of the tube 26 and that the vapor rises upward into the top of the tube 26 while the milk is delivered out of the pipe 42. The temperature to which the milk is raised is regulated by the distance between the electrodes and by the velocity of milk. The impurities will rise to the top of the vertical tube 26 and will be carried away from the milk through the pipe 68 to the vacuum tank within which only a very slight vacuum may be maintained and utilized very slowly by the reducing valve 69. If so desired the impurities may also be led into the free atmosphere through an ordinary pipe and allowed to escape although conditions usually exist to necessitate withdrawing these gaseous impurities in the manner indicated and this is the system which we prefer. It will thus be understood that as the impurities pass off from the milk in the form of a vapor or in gaseous form into the vacuum tank 65, when the pressure within the vacuum tank 65 by reason of the flow of gases away from the treated milk reaches a pressure equal to that of the atmosphere the valve 67 will open, thus allowing the gases to escape out into the atmosphere same as exhausting into free air. It will be understood, of course, that the valve 69 in the pipe 68 will be open and the valve 73 will be closed, or the valve 73 may be open and the valve 72 closed whereupon the vacuum gauge 71 will indicate the extent of the vacuum within the tank 65 and the system of pipes leading to the air compressor 49. Prior to the starting of the operation of the plant the valve 69 will be closed and the valves 72 and 73 opened and the air compressor 49 will be run a short time while discharging to the atmosphere freely for creating a suitable vacuum in the tank 65 whereupon the valve 73 will be opened and as soon as the apparatus is in operation the reducing valve 69 suitably opened to allow for the passage of the vapor into the vacuum tank 65 at a desired rate and preserving the vacuum in tank 65 for a comparatively long time.

It will thus be understood that we provide a complete apparatus for electrically treating milk or other liquid and that the system is completely enclosed until the discharge into the final receptacle so that no opportunity is afforded for the milk or other food product to become contaminated by reason of the absorption of any odors or exposure to bacteria laden air; and it will also be understood that a varying pressure can be maintained so that the milk is forced through the system in any quantity desired for any setting of the electrodes without affecting the amount of electric current passing, and which we have found to be approximately fifty (50) gallons per hour for a single tube such as illustrated. It will also be understood that a number of tubes such as 28 having suitable electrodes mounted therein, such as illustrated, may be provided so that the capacity of the apparatus can be increased to any amount desired by a plurality of such tubes properly equipped with electrodes such as illustrated, and such an arrangement we contemplate within the spirit and scope of our invention.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

We claim:

1. In an apparatus for purifying liquids, the combination of a source of supply, an outlet pipe for said source of supply, a pair of spaced perforated electrodes in said outlet pipe of substantially the same diameter as said outlet pipe.

2. In combination, a series of supply tanks, means for connecting said tanks, an outlet pipe leading from one of said tanks having spaced perforated electrodes therein, the said electrodes having a discharge area substantially equal to the inside diameter of said outlet pipe.

3. In combination, a series of supply tanks, means for connecting said tanks, an outlet pipe leading from one of said tanks having spaced perforated electrodes therein, the said electrodes having a discharge area substantially equal to the inside diameter of said outlet pipe and means for forcing liquids through said tanks in said outlet pipe.

4. In an apparatus for purifying liquids, the combination of a receiving tank, a supply tank, means for connecting said tanks, a cylindrical tube having spaced perforated electrodes mounted therein, means for supplying compressed air to said receiving and supply tanks.

5. In an apparatus for purifying liquids, the combination of a mixing tank, a supply tank, a pipe connecting said tanks, a cylindrical receptacle having spaced perforated electrodes mounted therein, the said electrodes having a discharge area substantially equal to the inside diameter of said receptacle and means for supplying compressed air to said mixing and supply tanks.

6. In an apparatus for purifying liquids the combination of a receiving tank, a supply tank, a pipe connecting said tanks, a cylindrical receptacle having spaced perforated electrodes mounted therein, said electrodes having a discharge area substantially equal to the inside diameter of said receptacle, means for supplying compressed air to said receiving and supply tanks, and means for conducting gaseous impurities away from said receptacle.

7. In a liquid purifying apparatus the combination of a receiving tank, a supply tank, a cylindrical tube, a pair of electrodes mounted within said tube, means for supplying compressed air to said receiving and supply tanks, and suction means for carrying away the gaseous impurities from said liquid after the same have been removed from the liquid by the action of the electric current, 8. In a liquid purifying apparatus the combination of a receiving tank, a supply tank, a cylindrical receptacle having a connection with said supply tank, a pair of spaced perforated electrodes mounted within said cylindrical receptacle of substantially the same diameter as said receptacle, suction means for removing the gaseous impurities from said liquid, and means for supplying compressed air to said receiving and supply tanks whereby liquid is forced through said cylindrical receptacle and through the perforated electrodes.

9. In an apparatus for purifying liquids the combination of a receiving tank, a supply tank, a cylindrical receptacle, a pair of perforated electrodes within said receptacle, connections between said tanks and said cylindrical receptacle, a vacuum tank, means for exhausting the air from within said vacuum tank and a pipe connecting said vacuum tank with said cylindrical receptacle.

10. In an apparatus for purifying liquids the combination of a receiving tank, a supply tank, a cylindrical receptacle, a pair of spaced perforated electrodes within said receptacle, suction means for removing the impure gases from said receptacle and means for supplying compressed air to said receiving and supply tanks whereby the liquid is forced from said tanks.

11. In an apparatus for purifying liquids the combination of a receiving tank, a supply tank, connections between said receiving and supply tanks, a cylindrical receptacle, a pair of electrodes mounted within said cylindrical receptacle and spaced apart a predetermined distance, connections between said supply tank and said cylindrical receptacle, a compressed air tank, means for supplying said tank with compressed air, connections from said compressed air tank to said supply and receiving tanks, and means for conveying said gaseous impurities away from said cylindrical receptacle.

12. In a method of purifying liquids which consists of mixing the liquids in a receiving tank, forcing the liquid from said receiving tank into a supply tank, forcing the liquid through a restricted outlet pipe, causing a current of electricity to pass through said liquid as it passes through the outlet pipe and removing the impurities from the liquid.

13. In a method of purifying liquids which consists in mixing the liquids within a receiving tank, forcing said liquids from said receiving tank into a supply tank, further forcing the liquid from said supply tank through an outlet pipe and causing the liquid to pass through perforated electrodes located in the path of travel of the liquid whereby an electric current is passed through said liquid and removing the impurities from said liquid after it has passed through the electrodes.

14. In a method of purifying liquids which consists of mixing the liquids in a receiving tank, forcing said liquid from said receiving tank into a supply tank, forcing said liquid into a receptacle whereby a column of liquid is formed and passing an electric current through said column of liquid formed within said receptacle and removing the gaseous impurities from said liquid.

15. The improvement in the art of purifying liquids which consists in flowing the liquid through a restricted passage having spaced perforated electrodes therein, the said electrodes having a current discharge area substantially equal to the cross-sectional area of said passage, and passing a current of electricity through said liquid as it passes through said restricted passage.

16. The improvement in the art of purifying liquids which consists in forcing the liquid through a restricted passage having spaced perforated electrodes therein, the said electrodes having a current discharge area substantially equal to the cross-sectional area of the said restricted passage, and passing a current of electricity through the liquid as it passes through said passage.

17. The improvement in the art of purifying liquids which consists in flowing the liquid under pressure through a pipe having perforated electrodes located therein the electrodes being of substantially the same diameter as the inside diameter of the said pipe.

Signed at Chicago, State of Illinois, this 29th day of July A. D., 1918.

FREDERICK W. MITCHELL.
JOHN E. PFEFFER.